United States Patent
Dubs et al.

(10) Patent No.: US 7,921,172 B2
(45) Date of Patent: Apr. 5, 2011

(54) APPARATUS, SYSTEM, AND METHOD FOR WIRELESS PRESYNCING OF DATA

(75) Inventors: Justin Tyler Dubs, Durham, NC (US); Steven Richard Perrin, Raleigh, NC (US); James Joseph Thrasher, Efland, NC (US); Michael Terrell Vanover, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 157 days.

(21) Appl. No.: 12/350,145

(22) Filed: Jan. 7, 2009

(65) Prior Publication Data
US 2010/0174790 A1   Jul. 8, 2010

(51) Int. Cl.
*G06F 15/16* (2006.01)
*G06F 12/00* (2006.01)

(52) U.S. Cl. ........................................ 709/206; 709/207

(58) Field of Classification Search .......... 709/206–207, 709/217–219, 250
See application file for complete search history.

(56) References Cited

U.S. PATENT DOCUMENTS

| | | | |
|---|---|---|---|
| 7,269,626 B1 * | 9/2007 | Nguyen | 709/206 |
| 7,730,150 B2 * | 6/2010 | Warren et al. | 709/206 |
| 2004/0172453 A1 * | 9/2004 | De Mendonca et al. | 709/206 |
| 2004/0249892 A1 * | 12/2004 | Barriga et al. | 709/206 |
| 2005/0076085 A1 * | 4/2005 | Budd et al. | 709/206 |
| 2007/0266107 A1 * | 11/2007 | Friend et al. | 709/206 |
| 2007/0299923 A1 * | 12/2007 | Skelly et al. | 709/206 |
| 2008/0250112 A1 * | 10/2008 | Chen et al. | 709/206 |
| 2008/0294729 A1 * | 11/2008 | Ionescu et al. | 709/206 |
| 2008/0318553 A1 * | 12/2008 | Wong | 455/412.2 |
| 2009/0125602 A1 * | 5/2009 | Bhatia et al. | 709/207 |
| 2009/0216845 A1 * | 8/2009 | Giszczak | 709/206 |

* cited by examiner

*Primary Examiner* — Zarni Maung
(74) *Attorney, Agent, or Firm* — Kunzler Needham Massey & Thorpe (57) ABSTRACT

An apparatus, system, and method are disclosed for wireless presyncing of data. A scan module scans a partial email stored on a mobile electronic device. The partial email comprises subject text, address data, and a specified quantity of message text. A complete version of the partial email resides on a server. The server is in communication with the mobile electronic device over a wireless network. A download module determines if the partial email satisfies a priority policy. In addition, the download module downloads the complete email to the mobile electronic device if the partial email satisfies the priority policy.

19 Claims, 7 Drawing Sheets

APPARATUS, SYSTEM, AND METHOD FOR WIRELESS PRESYNCING OF DATA

BACKGROUND OF THE INVENTION

1. Field of the Invention

This invention relates to wireless data and more particularly relates to wireless presyncing of data.

2. Description of the Related Art

Mobile electronic devices are increasingly used to receive email messages while a user is away from a computer workstation. The mobile electronic device may be a dedicated mobile email device, a mobile telephone, a portable computer, or the like. The mobile electronic device may receive all emails sent to a specified email address. Alternatively, the mobile or chronic electronic device may retrieve emails from a server when the user is away from the computer workstation.

The mobile electronic device will typically download emails over a network from the server. Because mobile electronic devices often have less memory than a computer workstation, the mobile electronic device may download a partial email of each complete version of the email that resides on the server. The mobile electronic device may then download a complete email when selected by the user.

Unfortunately, the mobile electronic device may not always be in communication with the network. As a result, if the user attempts to view a complete email, the user will be unable to do so as only a partial email is stored on the mobile electronic device.

SUMMARY OF THE INVENTION

From the foregoing discussion, there is a need for an apparatus, system, and method that automate wireless presyncing of data. Beneficially, such an apparatus, system, and method would automatically download a complete email to a mobile electronic device if a partial email satisfies a priority policy.

The present invention has been developed in response to the present state of the art, and in particular, in response to the problems and needs in the art that have not yet been fully solved by currently available apparatus and methods for wireless presyncing of data. Accordingly, the present invention has been developed to provide an apparatus, system, and method for wireless presyncing of data that overcome many or all of the above-discussed shortcomings in the art.

The apparatus for wireless presyncing of data is provided with a plurality of modules configured to functionally execute the steps of scanning a partial email, determining that the partial email satisfies a priority policy, and downloading a complete email. These modules in the described embodiments include a scan module and a download module.

The scan module scans a partial email stored on a mobile electronic device. The partial email comprises subject text, address data, and a specified quantity of message text. A complete version of the partial email resides on a server. The server is in communication with the mobile electronic device over a wireless network.

The download module determines if the partial email satisfies a priority policy. In addition, the download module downloads the complete email to the mobile electronic device if the partial email satisfies the priority policy.

A system of the present invention is also presented for wireless presyncing of data. In particular, the system, in one embodiment, includes a network, a server, and a mobile electronic device. The mobile electronic device includes a memory, a scan module and a download module. The server is in communication with the wireless network.

The download module downloads a partial email over the network and stores the partial email in the memory. The scan module scans the partial email stored on the mobile electronic device. The partial email comprises subject text, address data, and a specified quantity of message text. A complete version of the partial email resides on the server.

The download module further determines if the partial email satisfies a priority policy. In addition, the download module downloads the complete email over the network to the mobile electronic device if the partial email satisfies the priority policy A method of the present invention is also presented for wireless presyncing of data. The method in the disclosed embodiments substantially includes the steps to carry out the functions presented above with respect to the operation of the described apparatus and system. In one embodiment, the method includes scanning a partial email, determining that the partial email satisfies a priority policy, and downloading a complete email.

A scan module scans a partial email stored on a mobile electronic device. The partial email comprises subject text, address data, and a specified quantity of message text. A complete version of the partial email resides on a server. The server is in communication with the mobile electronic device over a wireless network.

A download module determines if the partial email satisfies a priority policy. In addition, the download module downloads the complete email to the mobile electronic device if the partial email satisfies the priority policy.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention automates wireless presyncing of data. Beneficially, such an apparatus, system, and method would automatically download the complete email to the mobile electronic device if the partial email satisfies the priority policy. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
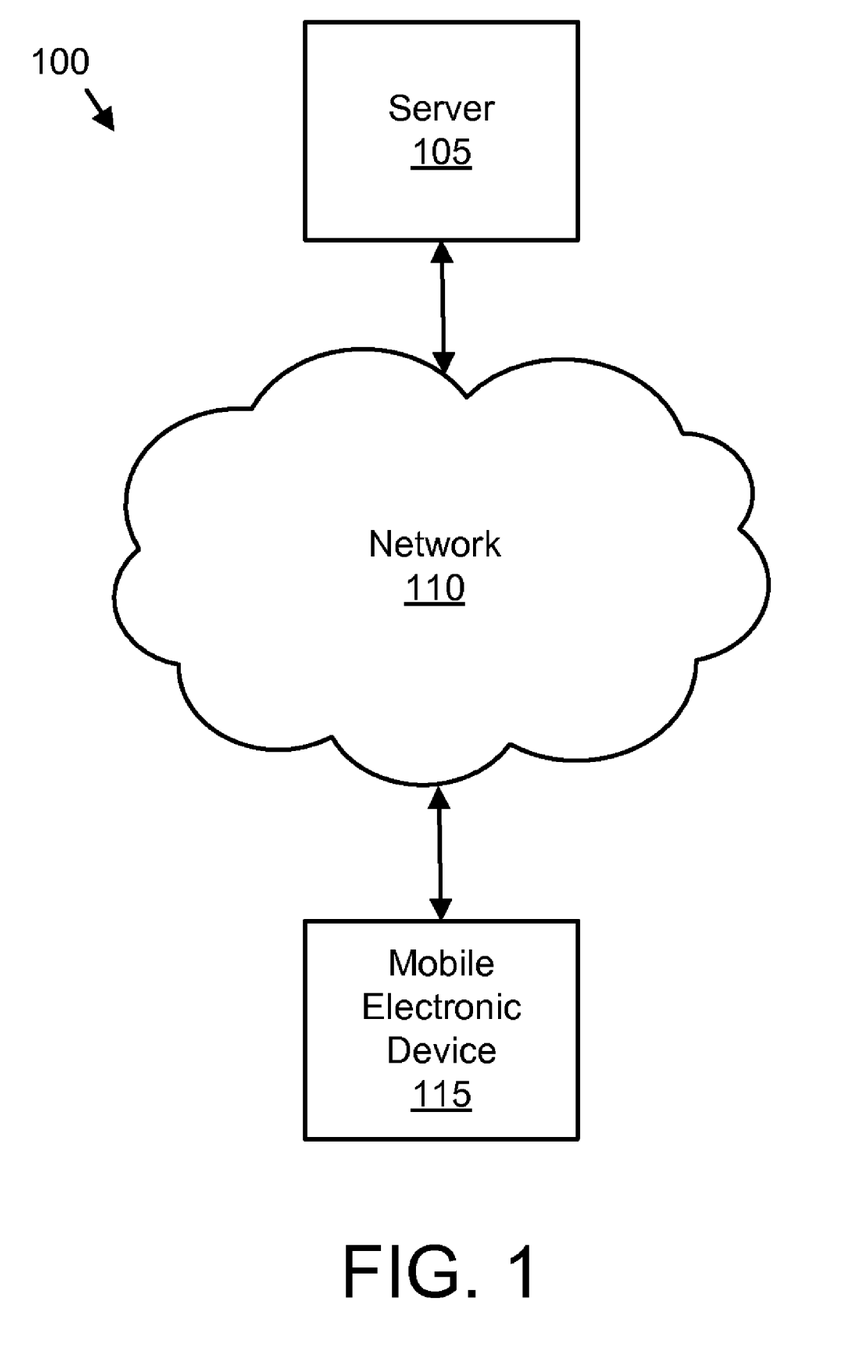
FIG. 1 is a schematic block diagram illustrating one embodiment of a system for wireless presyncing of data in accordance with the present invention.

FIG. 1 is a schematic block diagram illustrating one embodiment of a system 100 for wireless presyncing of data in accordance with the present invention. The system 100 includes a server 105, a network 110, and a mobile electronic device 115. Although, for simplicity one mobile electronic device 115, one network 110, and one server 105 are shown, any number of servers 105, networks 110, and mobile electronic devices 115 may be employed in the system 100.

The server 105 and the mobile electronic device 115 may include one or more processor modules, one or more volatile tangible memory modules, one or more non-volatile tangible memory modules, a basic input-output system (BIOS) module, one or more universal serial bus (USB) modules, one or more peripheral component interconnect (PCI) modules, one or more input output (I/O) devices, and the like. In addition, the server 105 and the mobile electronic device 115 may include one or more graphics modules, one or more audio and video modules, and the like.

These modules are referred to herein as components and may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The server 105 may be configured as a mainframe computer, a blade center comprising multiple blade servers, a mail delivery agent server, an email server, or the like. The server 105 may be located onsite at an enterprise, an office, or the like or off-site at a third party such as one or more Internet Service Providers (ISP) such as, AT&T® Wireless, T-mobile®, or the like, broadband service providers, website provider, email sites such as, Gmail® from Google Incorporated, Yahoo!® Mail from Yahoo! Incorporated, or the like.

The server 105 may store a plurality of email addresses of a plurality of users, personal account data for each user, a plurality of emails for a specified email address, or the like. In addition, the server 105 may immediately receive and store any incoming email.

The server 105 and the mobile electronic device 115 may provide frameworks and sets of software modules that may control functions such as security, mobility, identity-based content delivery, collaboration, business system integration, or the like of the data. For example, the server 105 and the mobile electronic device 115 may provide the frameworks and sets of software modules that are designed to set up, operate, and integrate email applications to one or more mobile electronic devices 115. The frameworks and sets of software modules, computer program products, or the like may be tangibly stored in the memory modules of the server 105 and the mobile electronic device 115.

The mobile electronic device 115 may be in communication with an external storage medium such as a compact flash data storage device, a data card, or the like. The external storage medium may store thereon security and configuration information such as one or more client certificates, an encryption key, a user profile, or the like.

The server 105 is in communication with the network 110. The network 110 may be a wireless email network. The wireless email network may include any type of wireless computer networks that use radio waves for transmission of data. In a particular example, the wireless email network may include wireless local area network (WLAN), a wireless wide area network (WAN), the Internet, a public or private Wi-Fi network, a bluetooth network, or the like, or a combination thereof.

In an embodiment, the network 110 is an Institute of Electrical and Electronic Engineers (IEEE) 802.11 compliant network. For example, the network 110 may comply to a set of standards of IEEE 802.11 for WLAN communication, in an industrial, scientific and medical (ISM) public spectrum radio band of two point four giga-hertz (2.4 GHz) to five giga-hertz (5 GHz). In a particular example, the IEEE 802.11b and IEEE 802.11g compliant network may use the two point four giga-hertz (2.4 GHz) ISM band. In addition, the IEEE 802.11b and IEEE 802.11g compliant network may use direct sequence spread spectrum signaling (DSSS) method.

In another embodiment, the network 110 is a Bluetooth Special Interest Group Bluetooth compliant network. The Bluetooth Special Interest Group Bluetooth compliant network may support unlicensed ISM microwave radio frequency public spectrum in a range of two point four giga-hertz (2.4 GHz) to two point four eight three five giga-hertz (2.4835 GHz). In addition, the Bluetooth Special Interest Group Bluetooth may employ a frequency hop transceiver (FHT) technology to combat interference and fading as is well known to those of skill in the art.

In one more embodiment, the network 110 is a mobile phone network. The mobile phone network may include a plurality of radio cells, each served by a fixed transmitter. The radio cells may cover different areas in order to provide radio coverage over a wider area than the area of one cell as is well known to those of skill in the art.

The mobile electronic device 115 is in communication with the network 110. The mobile electronic device 115 may include one or more transceivers or antenna that may communicate wirelessly with the network 110 as is well known to those of skill in the art.

The user may download the email with standard protocols such as the Post Office Protocol (POP), Internet Message Access Protocol (IMAP) protocols, or the like. Alternatively, the user may download the email with a proprietary protocol specific to the server 105, for example configured as a Lotus Notes® server, a BlackBerry® Connect server, or the like In an embodiment, the mobile electronic device 115 is used to receive or retrieve one or more emails sent to the specified email address while the user is away from the computer workstation. The mobile electronic device 105 may download emails over the network 110 from the server 105. In an embodiment, the mobile electronic device 115 may have less memory and hence may download a partial email of a complete version of the email that resides on the server 105. The mobile electronic device 115 may then download the complete email when the user selects the partial email.

The mobile electronic device 115 may not always be in communication with the network 110. As a result, if the user attempts to view the complete email, the user will be unable to view the complete email, as only the partial email is stored on the mobile electronic device 115. The present invention automates download of the complete email to the mobile electronic device 115 if the partial email satisfies a priority policy as will be described hereafter.

Figure 2:
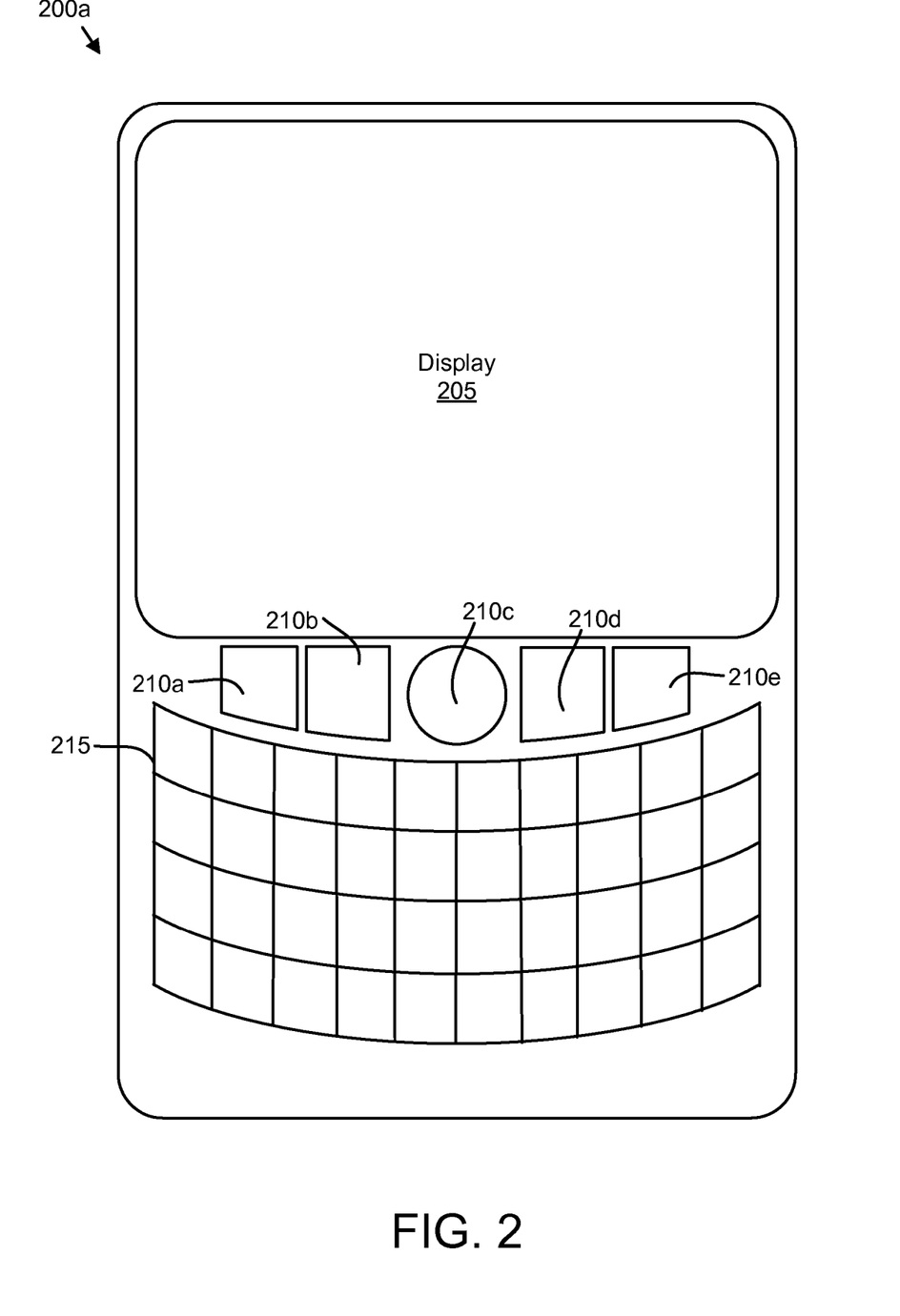
FIG. 2 is a drawing illustrating one embodiment of a mobile phone of the present invention.

FIG. 2 is a drawing illustrating one embodiment of a mobile phone 200a in accordance with the present invention. The mobile phone 200a includes a display 205, buttons 210a-e, and a keypad 215. The description of the mobile phone 200a refers to elements of FIG. 1, like numbers referring to like elements. Although, for simplicity, only five (5) buttons 210a-e are shown, any number of buttons 210a-e may be employed in the mobile phone 200a.

The mobile electronic device 115 of FIG. 1 may be configured as the mobile phone 200a of FIG. 2. The display 205 of the mobile phone 200a may be configured as a liquid crystal display (LCD), a thin film transistor liquid crystal display (TFT-LCD), or the like. In a particular example, the display 205 may display contents of the email as is well known to those of skill in the art.

The display 205 may be configured as a touchscreen. The touchscreen display 205 may detect a location of a stylus touching within a display area. Thus, the display 205 may be used as an input device for interacting with content on the display 205.

The buttons 210a-e may allow the user to control a plurality of functions of the mobile phone 200a. For example, the button 210a may be used to power on or off the mobile phone 200a, the button 210b may be configured as an "OK" button to enable the user to click or perform a suitable event, the button 210c may be configured as a "select" button to enable the user to select an option of a menu, and the like.

Additionally, the mobile phone 200a may include a software framework that includes a web browser and/or a mail client. For example, the mobile electronic device 115 may employ an operating system selected from a Linux-based operating system, Symbian® operating system, Blackberry® operating system, or the like, a mobile browser such as a wireless application protocol (WAP) mobile browser, a microbrowser, or the like, and/or a connecting software such as Blackberry® Connect, Sidekick® Unlimited Service, and the like. The browser may be optimized to display contents of the email in the form of HyperText Markup Language (HTML) codes of textual words, one or more pictures/drawings, tables, hyperlinks, or the like on the display 205.

Figure 3:
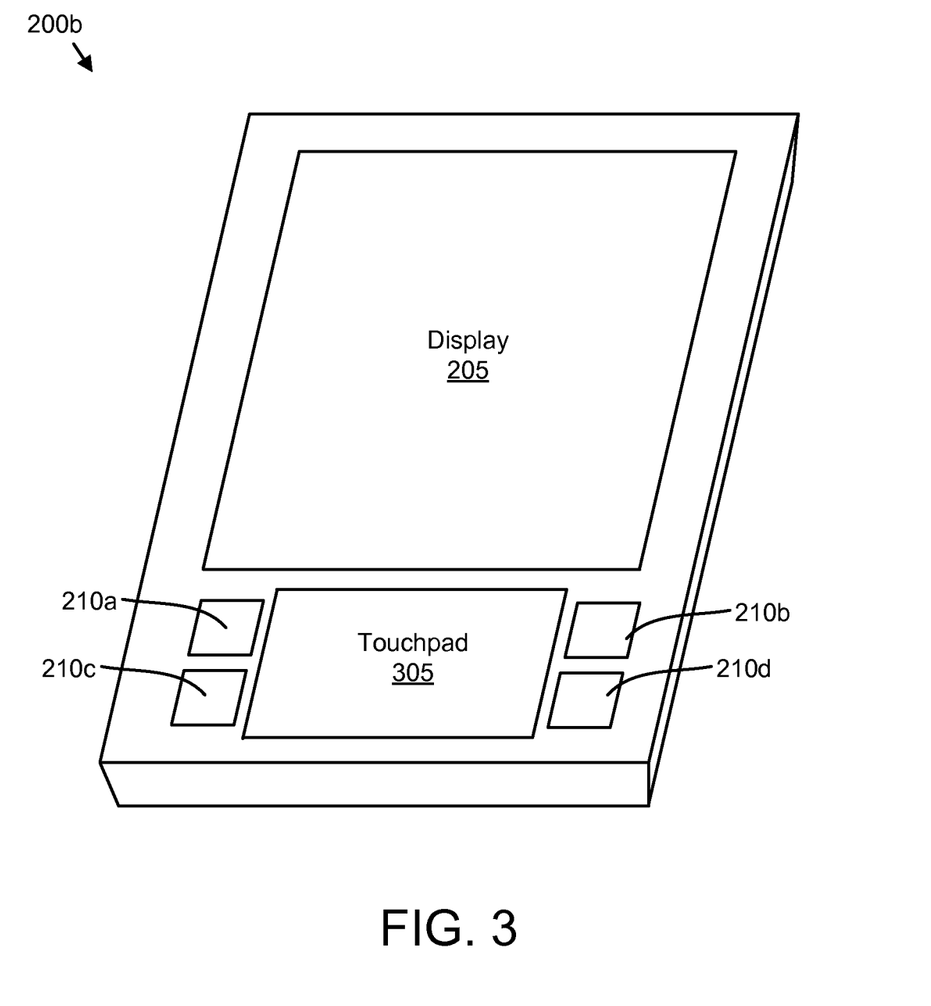
FIG. 3 is a perspective drawing illustrating one embodiment of a Personal Digital Assistant (PDA) of the present invention.

FIG. 3 is a perspective diagram illustrating one embodiment of a PDA 200b in accordance with the present invention. The PDA 200b includes a touchpad 305, the buttons 210a-d, and the display 205. The description of the PDA 200b refers to elements of FIGS. 1-2, like numbers referring to like elements. Although, for simplicity, only one touchpad 305 and four (4) buttons 210a-d are shown with the PDA 200b, any number of touchpads 305 and buttons 210a-d may be employed.

The mobile electronic device 115 of FIG. 1 may be configured as the PDA 200b of FIG. 3. The display 205 and the buttons 210a-d of the PDA 200b may function like the display 205 and the buttons 210a-e of the mobile phone 200a of FIG. 2.

The touchpad 305 may allow inputting one or more spatial inputs and/or controlling movements of a cursor displayed on the display 205. The cursor may move in same direction as a motion of the finger moving on a surface of the touchpad 305. The touchpad 305 may also allow moving one or more fingers along an edge of the touchpad 305 to act as a scroll wheel. The touchpad 305 may be selected from a resistive touchpad, a capacitive touchpad, an electromagnetic touchpad, or the like of suitable size to fit in a recess in a body of the PDA 200b.

Figure 4:
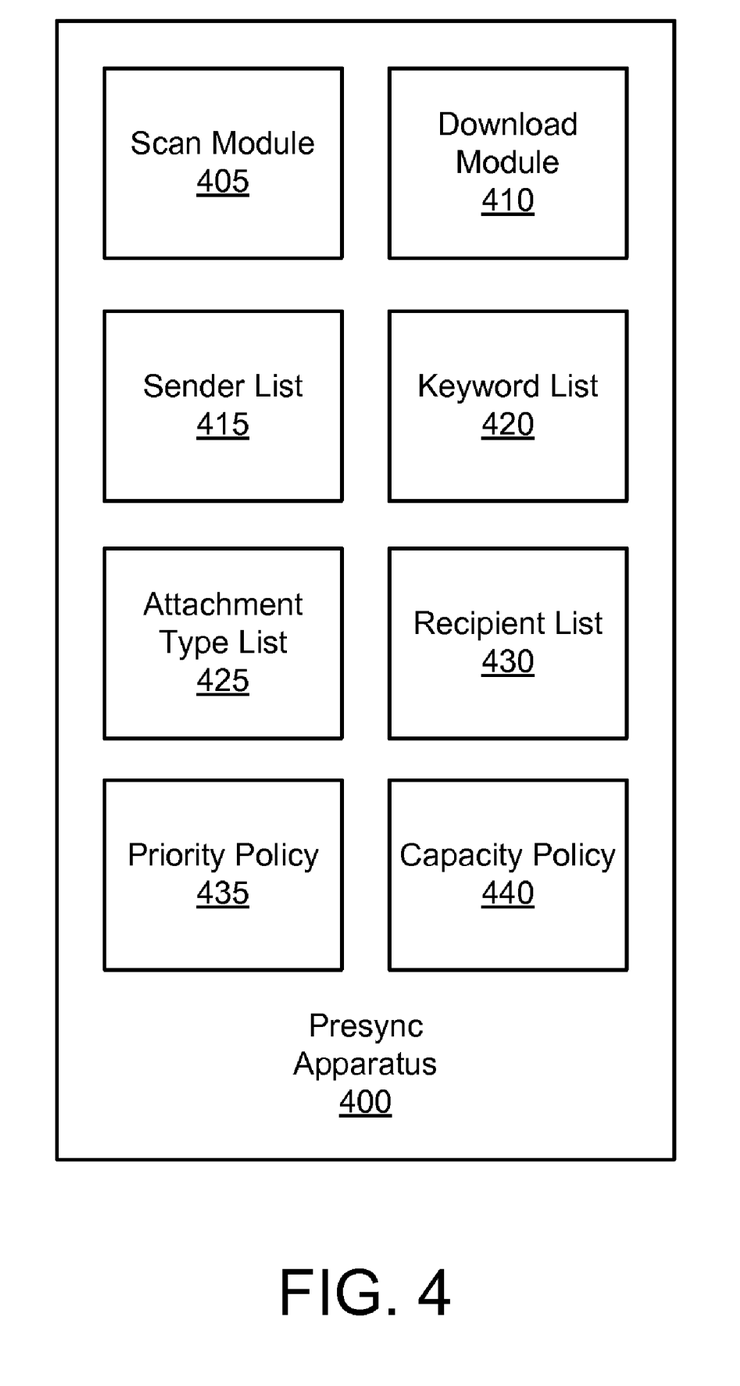
FIG. 4 is a schematic block diagram illustrating one embodiment of a presync apparatus of the present invention.

FIG. 4 is a schematic block diagram illustrating one embodiment of a presync apparatus 400 of the present invention. The apparatus 400 automates download of a complete email. The apparatus can be embodied in the mobile electronic device 115 of FIG. 1, the mobile phone 200a of FIG. 2, and the PDA 200b of FIG. 3. The description of apparatus 400 refers to elements of FIGS. 1-3, like numbers referring to like elements. The apparatus 400 includes a scan module 405 and a download module 410. In addition, the apparatus 400 may include a sender list 415, a keyword list 420, an attachment type list 425, a recipient list 430, a priority policy 435, and a capacity policy 440.

In an embodiment, the download module 410 downloads a partial email to the mobile electronic device 115. The partial email comprises subject text, address data, and a specified quantity of message text.

The partial email may comprise the subject text configured as one or more textual words for example, "Urgent," "ASAP," "client meeting," "Reschedule," "Soccer," or the like in a header field "Subject:." The address data may comprise an email address for example, "abc@x.org" of a recipient in a header field "To:," and an email address for example, "jkl@y.gov" of a sender in a header field "From:." The specified quantity of message text may comprise a portion for example, of the value of two kilobytes (2 KB) of textual words of the complete email. In addition, the partial email may also comprise a file name of an attachment in an attachment field, if there is an attachment or image with the email.

A complete version of the partial email resides on the server 105. The complete version of the partial email may be the email that the sender actually sends to the recipient. In addition, the complete versions of a plurality of complete emails may reside on the server 105.

The scan module 405 scans the partial email stored on the mobile electronic device 115. The scan module 405 may scan 510 the partial email to determine a keyword, the email address of the sender, the email address of the recipient, the attachment type, and the like.

The scan module 405 may include computer usable medium having a computer readable program stored on a tangible storage device. The computer readable program is executed on a computer. In one embodiment, the computer usable medium is stored on a memory such as read only memory (ROM) or a Flash Random Access Memory (RAM) and is executed by the processor of the mobile electronic device 115.

The download module 410 determines if the partial email satisfies a priority policy 435. The priority policy 435 may be satisfied if the email is from the sender on a specified sender list 415.

The specified sender list 415 may include a plurality of email addresses of probable email senders. In a particular example, the specified sender list 415 may include the email address "jkl@y.gov," an email address "lmn@a.org," an email address "opq@b.co.uk," or the like.

The user may use the keypad 215 and/or the buttons 210a-e to add and edit email addresses in the specified sender list 415 in a memory of the mobile electronic device 115. Alternatively, the download module 410 may create the sender list 415 by parsing email addresses from emails that the recipient views viewed before other emails, that are responded to, that are responded to before other emails, or that the recipient retains for extended periods.

The priority policy 435 may also be satisfied if the partial email comprises a keyword from the specified keyword list 420. The specified keyword list 420 may include a plurality of keywords. The plurality of keywords may include textual words such as "Lenovo," "audit," "board meeting," or the like, alpha-numeric strings such as "26 February," "$20^{th}$ December," or the like. The user may use the keypad 215 and/or the buttons 210a-e to add and edit keywords in the specified keyword list 420 in the memory of the mobile electronic device 115. Alternatively, the download module 410 may add keywords to the keyword list 420 that are parsed from the subject field of the emails that the user views viewed before other emails, that are responded to, that are responded to before other emails, or that the user retains for extended periods.

In addition, the priority policy 435 may also be satisfied if the email comprises an attachment of a type from the specified attachment type list 425. The specified attachment type list 425 may include a plurality of file names of attachments as is well known to those of skill in the art. The user may use the keypad 215 and/or the buttons 210a-e to create and edit the specified attachment type list 425 in the memory of the mobile electronic device 115. In an alternate embodiment, the download module 410 adds file names to the attachment type list 425 that are parsed from the attachment field of emails that the user views viewed before other emails, that are responded to, that are responded to before other emails, or that the user retains for extended periods.

In one embodiment, the priority policy 435 is satisfied if the address data comprises at least one recipient from the specified recipient list 430. The specified recipient list 430 may include a plurality of email addresses of intended recipients of the email. In a particular example, the specified recipient list 430 may include the email address "abc@x.org," an email address "def@z.co.in," or the like.

The user may use the keypad 215 and/or the plurality of buttons 210a-e to create and edit the specified recipient list 430 in the memory of the mobile electronic device 115. Alternatively, the download module 410 may add recipient email addresses from emails that the user views viewed before other emails, that are responded to, that are responded to before other emails, or that the user retains for extended periods.

The download module 410 downloads the complete email to the mobile electronic device 115 if the email satisfies the priority policy 435. Alternatively, the download module 410 may download the complete email to the mobile electronic device 115 if the partial email does not satisfy the priority policy 435 and satisfies the capacity policy 440.

The partial email may satisfy the capacity policy 440 if the complete email is the smallest size of a plurality of complete emails stored on the server 105. The partial email may also satisfy the capacity policy 440 if storing the complete email on the mobile electronic device 115 does not increase an email storage space usage on the mobile electronic device 115 above a capacity threshold. The capacity threshold may be in the range of 25% to 70% of maximum capacity.

The down load module 410 may include computer usable medium having a computer readable program stored on a tangible storage device. The computer readable program is executed on a computer. In one embodiment, the computer usable medium is stored on a memory such as ROM or a Flash RAM and is executed by the processor of the mobile electronic device 115.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
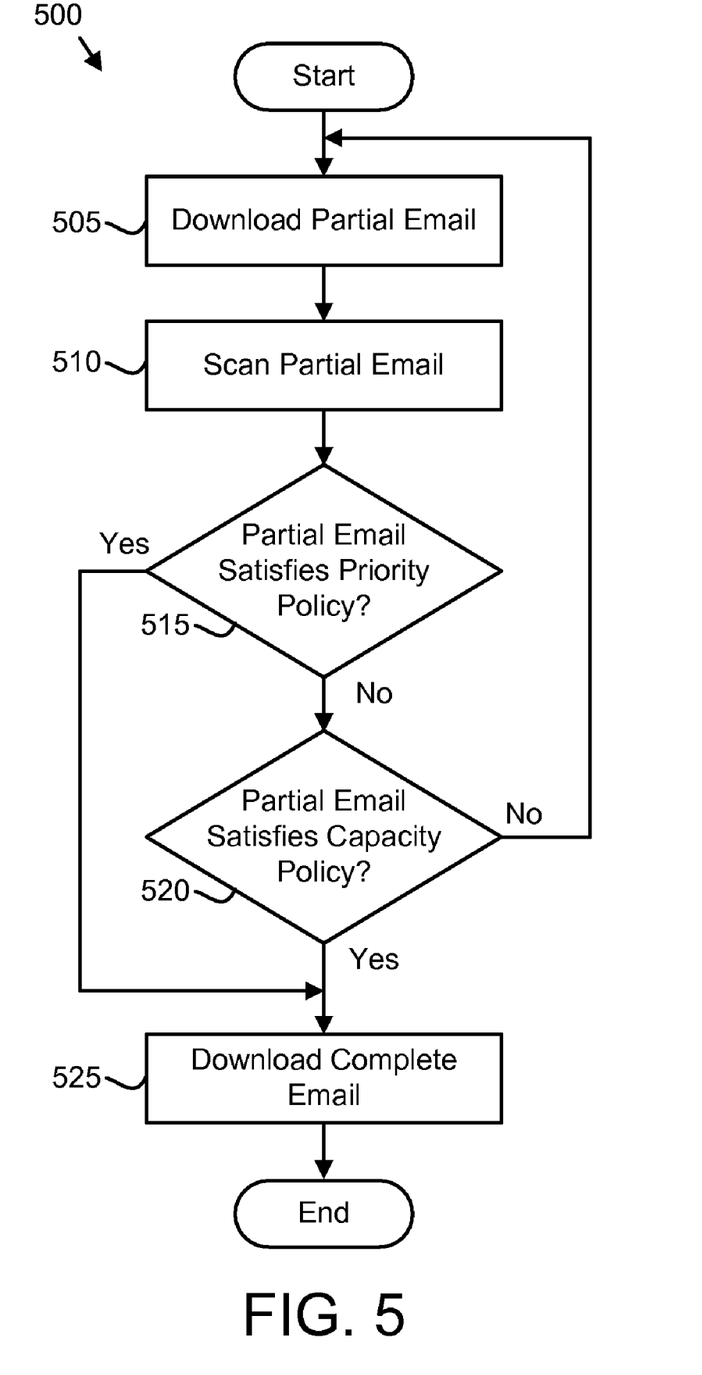
FIG. 5 is a schematic flow chart diagram illustrating one embodiment of a method for wireless presyncing of data of the present invention.

FIG. 5 is a schematic flow chart diagram illustrating one embodiment of a method 500 for wireless presyncing of data of the present invention. The method 500 substantially includes the steps to carry out the functions presented above with respect to the operation of the described apparatus 400, mobile phone 200a, PDA 200b, and system 100 of FIGS. 4, 2, 3, and 1 respectively. The description of method 500 refers to elements of FIGS. 1-4, like numbers referring to like elements. In one embodiment, the method 500 is implemented with a computer program product comprising a computer usable medium having a computer readable program stored on a tangible storage device. The computer readable program may be executed by a processor of the mobile phone 200a, or PDA 200b.

The method 500 begins, and in an embodiment, the download module 410 downloads 505 the partial email over the network 110 and stores the partial email in the memory. The partial email comprises subject text, address data, and a specified quantity of message text. For example, the download module 410 may automatically establish a wireless communication between the server 105 and the mobile electronic device 115 over the network 110 to download 505 and store the partial email.

The scan module 405 scans 510 the partial email stored on the mobile electronic device 115. For example, the scan module 405 may automatically scan 510 the partial email stored on the mobile electronic device 115 to determine that the keyword "Meeting Agenda," the email address abc@x.org of the recipient, the email address "jkl@y.gov" of the sender, and the like are contained in the partial email.

The download module 410 further determines 515 if the partial email satisfies the priority policy 435. The download module 410 may automatically determine 515 that the partial email satisfies or does not satisfy the priority policy 435 as will be described hereafter in the description of FIG. 6. Alternatively, the download module may calculate a download weight d as shown in Equation 1, where each k is a constant, s is set to one if a sender is on the sender list 415, w is a number of keywords from the partial email found in the keyword list 420, t is a number of attachment types from the partial email found in the attachment type list 425, and r is a number of recipients from the partial email found in the recipient list 430 to determine if the partial email satisfies the priority policy 435.

$$d = k_1 s + k_2 w + k_3 t + k_4 r \quad \text{Equation 1}$$

The download module 410 may determine 515 that the partial email satisfies the priority policy 435 if the download weight d exceeds a weight threshold.

The download module 410 downloads 525 the complete email to the mobile electronic device 115 if the download module 410 determines 515 that the partial email satisfies the priority policy 435. If the download module 410 determines 515 that the partial email does not satisfy the priority policy 435 the download module 410 may further determine 520 if the partial email satisfies the capacity policy 440 as will be described hereafter in the description of FIG. 7.

If the download module 410 determines 520 that the partial email satisfies the capacity policy 440, the download module 410 downloads 525 the complete email to the mobile electronic device 115 and the method 500 ends. If the download module 410 determines 520 that the partial email does not satisfy the capacity policy 440, the method 500 loops to the step 505. Thus, the method 500 automates download of the complete email if the partial email satisfies the priority policy 435 or satisfies the capacity policy 440.

Thus the present invention supports downloading complete emails for partial emails that satisfy the priority policy 435. A user may later view downloaded complete emails without waiting for the complete email to download. The user may also view the downloaded complete email even if the mobile electronic device 115 is not in communication with the network 110.

Figure 6:
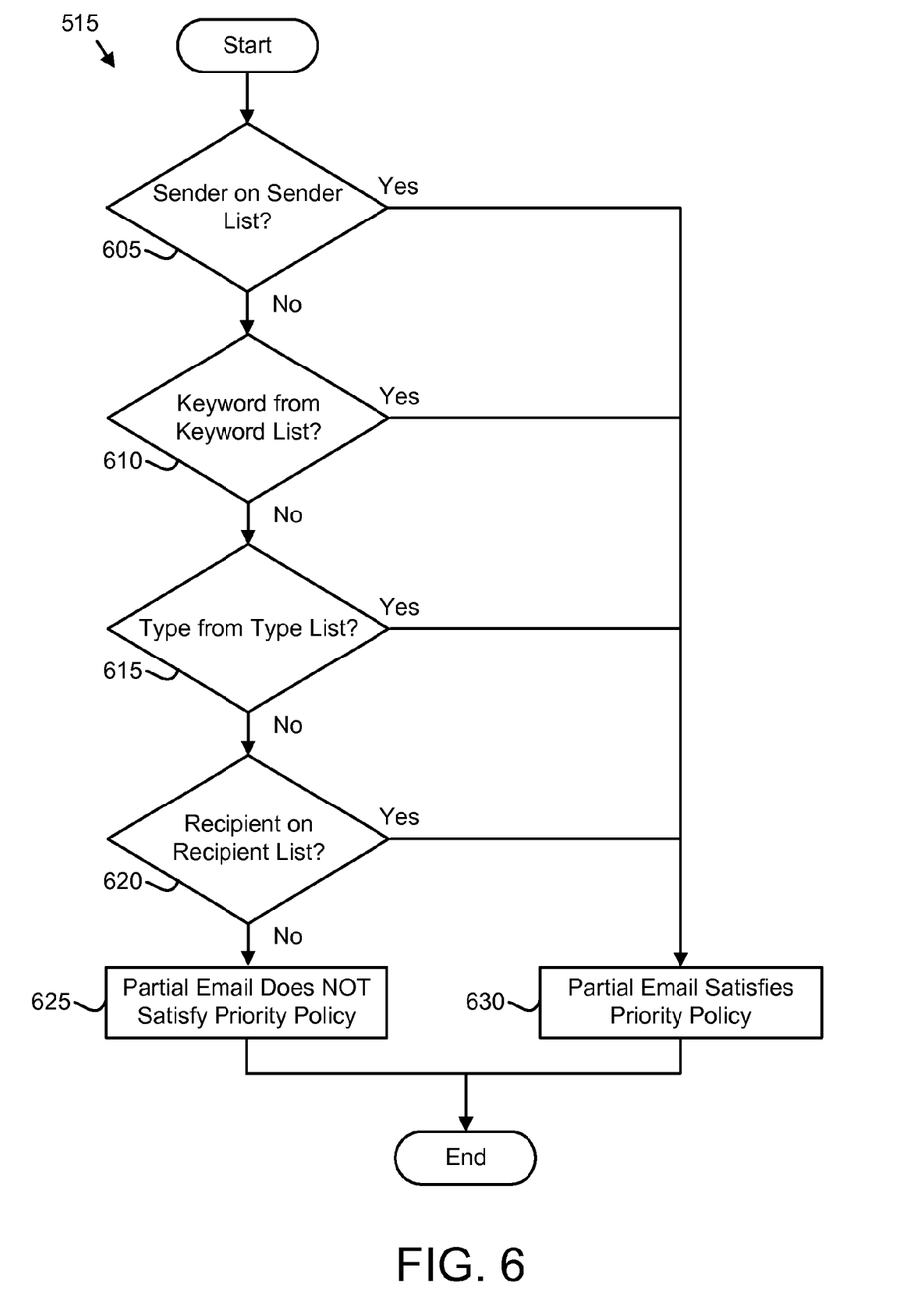
FIG. 6 is a schematic flow chart diagram illustrating one embodiment of a step for determining if a partial email satisfies a priority policy of the present invention.

FIG. 6 is a schematic flow chart diagram illustrating one embodiment of the step 515 for determining if the partial email satisfies the priority policy 435 of the present invention. The description of the step 515 of FIG. 6 refers to elements of FIGS. 1-5, like numbers referring to like elements.

The step 515 begins, and in an embodiment, the download module 410 determines 605 if the sender is on the sender list 415. The download module 410 may compare the scanned email address of the sender with the plurality of email addresses that form the sender list 415 one-by-one. On exactly matching the scanned email address with one email address of the sender list 415, the download module 410 may determine 605 that the sender is on the sender list 415. Otherwise, the download module 410 may determine 605 that the sender is not on the sender list 415.

In a particular example, the download module 410 may automatically determine 605 that the sender is on the sender list 415 since the scanned email address "jkl@y.gov" matches exactly with one email address "jkl@y.gov" among the plurality email addresses that form the sender list 415. If the download module 410 determines 605 that the sender is on the sender list 415, the download module 410 further determines 630 that the partial email satisfies the priority policy 435.

If the download module 410 determines 605 that the sender is not on the sender list 415, the download module 410 further determines 610 if the keyword is on the keyword list 420. The download module 410 may compare one or more scanned keywords with the plurality of keywords that form the keyword list 420 one-by-one. If a scanned keyword does not match with any keyword of the keyword list 420, the download module 410 may determine 610 that the keyword is not on the keyword list 420. Otherwise, the download module 410 may determine 610 that the keyword is on the keyword list 420.

In a particular example, the download module 410 may automatically determine 610 that the scanned keyword is not on the keyword list 420 since on comparison the scanned keyword "Meeting Agenda," does not match with any keyword such as "Lenovo," "audit," "board meeting," "26 February," "20$^{th}$ December" that form the keyword list 420. If the download module 410 determines 610 that the keyword is on the keyword list 420, the download module 410 further determines 630 that the partial email satisfies the priority policy 435.

If the download module 410 determines 610 that the keyword is not on the keyword list 420, the download module 410 further determines 615 if the attachment is of the type from the specified attachment type list 425. The download module 410 may automatically compare a scanned attachment type with the plurality of attachment types that form the attachment type list 425 one-by-one. For example, on exactly matching the scanned attachment type ".xls" with one attachment type ".xls" of the attachment type list 425, the download module 410 may determine 615 that the attachment is of the type from the specified attachment type list 425. Otherwise, the download module 410 may determine 615 that the attachment is not of the type from the specified attachment type list 425.

If the download module 410 determines 615 that the attachment is of the type from the specified attachment type list 425, the download module 410 further determines 630 that the partial email satisfies the priority policy 435. If the download module 410 determines 615 that the attachment type is not from the specified attachment type list, the download module 410 further determines 620 if the recipient is from the specified recipient list 430.

The download module 410 may compare the scanned email address of the recipient with the plurality of email addresses that form the recipient list 430 one-by-one. On exactly matching the scanned email address with an email address of the recipient list 430 the download module 410 may determine 620 that the recipient is on the recipient list 430. Otherwise, the download module 410 may determine 620 that the recipient is not on the recipient list 430.

In a particular example, the download module 410 may automatically determine 620 that the recipient is on the recipient list 430 since the scanned email address "abc@x.org" of the recipient matches exactly with one email address "abc@x.org" among the plurality email addresses that form the recipient list 430. If the download module 410 determines 620 that the recipient is on the recipient list 430, the download module 410 further determines 630 that the partial email satisfies the priority policy 435 and step 515 ends. If the download module 410 determines 620 that the recipient is not on the recipient list 430, the download module 410 further determines 625 that the partial email does not satisfy the priority policy 435 and step 515 ends. In addition, if the download module 410 determines 625 that the partial email does satisfies the priority policy 435, the step 515 further moves to step 520 of FIG. 5 as previously described.

Figure 7:
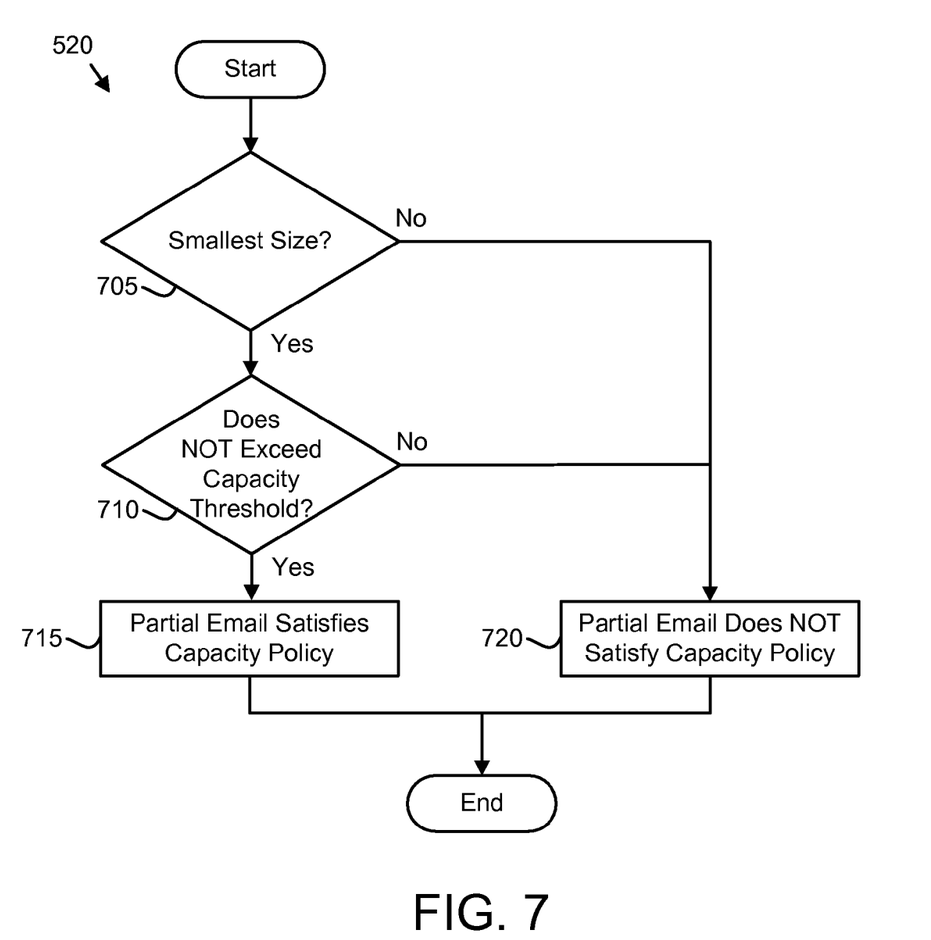
FIG. 7 is a schematic flow chart diagram illustrating one embodiment of a step for determining if the partial email satisfies a capacity policy of the present invention.

FIG. 7 is a schematic flow chart diagram illustrating one embodiment of the step 520 for determining if the partial email satisfies a capacity policy 440 of the present invention. The description of the step 515 of FIG. 7 refers to elements of FIGS. 1-6, like numbers referring to like elements.

The step 520 begins, and in an embodiment, the download module 410 determines 705 that the complete email is the smallest size of the plurality of complete emails stored on the server 105 or not. The partial email under consideration may be email that is received the latest for the specified email address of the recipient on the server 105. The complete email may be the complete version of the partial email under consideration and may reside on the server 105. The server 105 may store the plurality of emails. Each email may be of certain size.

For example, server 105 may store a first email of the size of one hundred five kilobytes (105 KB), a second email of the size of one hundred fifty five kilobytes (155 KB), a third email of the size of fifty five kilobytes (55 KB), or the like. The first, third and second email may be the email received the earliest, the latest, and in between respectively. Continuing with the above example, the download module 410 may determine 705 that the complete email is of the smallest size of the plurality of emails stored on the server 105. If the download module 410 determines 705 that the complete email is not of the smallest size of the plurality of complete emails stored on the server 105, the download module 410 further determines 720 that the partial email does not satisfy the capacity policy 440.

If the download module 410 determines 705 that the complete email is of the smallest size of the plurality of complete emails stored on the server 105, the download module 410 further determines 710 that storing the complete email on the mobile electronic device 115 does not increase the email storage space usage on the mobile electronic device 115 above the capacity threshold.

The capacity threshold may be in the range of 25% to 70% of the maximum capacity. The maximum capacity may be the maximum storage capacity of the mobile electronic device 115. For example, the maximum capacity may be of the value of sixty-four megabytes (64 MB). Thus, the capacity threshold may be in the range of sixteen megabytes (16 MB) to forty-four point eight megabytes (44.80 MB). In a particular example, the capacity threshold may be of the value of forty megabytes (40 MB).

For example, the download module 410 may calculate a usage value by adding the size of the complete email to a present email storage space usage of the mobile electronic device 115. If the usage value is above the capacity threshold, the download module 410 may determine 710 that storing the complete email on the mobile electronic device 115 may increase the email storage space usage above the capacity threshold. Otherwise, the download module 410 may determine 710 that storing the complete email on the mobile electronic device 115 may not increase the email storage space usage above the capacity threshold.

If the download module 410 determines 710 that storing the complete email on the mobile electronic device 115 may increase the email storage space usage on the mobile electronic device 115 above the capacity threshold, the download module 410 further determines 720 that the partial email does not satisfy the capacity policy 440 and step 520 ends. If the download module 410 determines 710 that storing the complete email on the mobile electronic device 115 do not increase email storage space usage above the capacity threshold, the download module 410 further determines 715 that the partial email satisfies the capacity policy 440 and step 520 ends.

The present invention automates wireless presyncing of data. Beneficially, such an apparatus, system, and method would automatically download a complete email to the mobile electronic device 115 if a partial email satisfies the priority policy 435. In addition, the apparatus, system, and method would automatically start downloading the complete email to the mobile electronic device 115 if the partial email does not satisfy the priority policy 435 and satisfies the capacity policy 440. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer useable medium having a computer readable program stored on a tangible storage device, wherein the computer readable program when executed on a computer causes the computer to:
   scan a partial email stored on a mobile electronic device, wherein the partial email comprises subject text, address data, and a specified quantity of message text, and a complete version of the partial email resides on a server in communication with the mobile electronic device over a wireless network;
   determine if the partial email satisfies a priority policy; and
   download the complete email to the mobile electronic device if the partial email satisfies the priority policy else download the complete email to the mobile electronic device if the partial email does not satisfy the priority policy and satisfies a capacity policy.

2. The computer program product of claim 1, wherein the priority policy is satisfied if the email is from a sender on a specified sender list.

3. The computer program product of claim 1, wherein the priority policy is satisfied if the partial email comprises a keyword from a specified keyword list.

4. The computer program product of claim 1, wherein the priority policy is satisfied if the email comprises an attachment of a type from a specified attachment type list.

5. The computer program product of claim 1, wherein the priority policy is satisfied if the address data comprises at least one recipient from a specified recipient list.

6. The computer program product of claim 1, the computer readable program further causing the computer to download the partial email to the mobile electronic device.

7. The computer program product of claim 1, wherein the partial email satisfies the capacity policy if the complete email is the smallest size of a plurality of complete emails stored on the server.

8. The computer program product of claim 1, wherein the partial email satisfies the capacity policy if storing the complete email on the mobile electronic device does not increase an email storage space usage on the mobile electronic device above a capacity threshold.

9. The computer program product of claim 8, wherein the capacity threshold is in the range of 25% to 70% of maximum capacity.

10. An apparatus comprising:
a tangible storage device storing a computer readable program;
a processor executing the computer readable program, the computer readable program comprising:
a scan module that scans a partial email stored on a mobile electronic device, wherein the partial email comprises subject text, address data, and a specified quantity of message text, and a complete version of the partial email resides on a server in communication with the mobile electronic device over a wireless network; and
a download module that determines if the partial email satisfies a priority policy and downloads the complete email to the mobile electronic device if the partial email satisfies the priority policy else download the complete email to the mobile electronic device if the partial email does not satisfy the priority policy and satisfies a capacity policy.

11. The apparatus of claim 10, wherein the priority policy is satisfied if the email is from a sender on a specified sender list.

12. The apparatus of claim 10, wherein the priority policy is satisfied if the email comprises a keyword from a specified keyword list.

13. The apparatus of claim 10, wherein the priority policy is satisfied if the email comprises an attachment of a type from a specified attachment type list.

14. The apparatus of claim 10, wherein the priority policy is satisfied if the address data comprises at least one recipient from a specified recipient list.

15. A system comprising:
a network;
a server in communication with the wireless network;
a mobile electronic device in communication with the wireless network and comprising
a memory;
a download module that downloads a partial email over the network and stores the partial email in the memory;
a scan module that scans the partial email stored on the mobile electronic device, wherein the partial email comprises subject text, address data, and a specified quantity of message text, and a complete version of the partial email resides on the server; and
the download module further determining if the partial email satisfies a priority policy and downloading the complete email over the network to the mobile electronic device if the partial email satisfies the priority policy else download the complete email to the mobile electronic device if the partial email does not satisfy the priority policy and satisfies a capacity policy.

16. The system of claim 15, wherein the network is a wireless email network.

17. The system of claim 15, wherein the network is an Institute of Electrical and Electronic Engineers 802.11 compliant network.

18. The system of claim 15, wherein the network is a Bluetooth Special Interest Group Bluetooth compliant network.

19. The system of claim 15, wherein the network is a mobile phone network.

* * * * *